United States Patent [19]

Sedlack

[11] Patent Number: 4,909,574

[45] Date of Patent: Mar. 20, 1990

[54] CHILD'S CAR SEAT RESTRAINT SYSTEM

[75] Inventor: Mark Sedlack, Macedonia, Ohio

[73] Assignee: Century Products Company, Macedonia, Ohio

[21] Appl. No.: 269,525

[22] Filed: Nov. 14, 1988

[51] Int. Cl.⁴ .............................................. A47D 15/00
[52] U.S. Cl. .................................... 297/488; 297/450; 248/222.1
[58] Field of Search ............... 297/488, 450, 487, 409, 297/148, 467; 248/222.1, 298; 292/150, 170

[56] References Cited

U.S. PATENT DOCUMENTS

| | | | |
|---|---|---|---|
| 1,257,998 | 3/1918 | Gruber | 292/170 |
| 3,165,333 | 1/1965 | Dalgleish | 297/487 |
| 4,456,302 | 6/1984 | Knoedler et al. | 297/488 |
| 4,568,122 | 2/1986 | Kain | 297/250 |
| 4,634,185 | 1/1987 | Kassai | 297/487 |
| 4,655,506 | 4/1987 | Wise et al. | 297/467 |
| 4,662,683 | 5/1987 | Knoedler et al. | 297/488 |
| 4,664,443 | 5/1987 | Casale | 297/488 |
| 4,729,600 | 3/1988 | Single, II et al. | 297/488 |
| 4,770,468 | 9/1988 | Shubin | 297/488 |

Primary Examiner—Kenneth J. Dorner
Assistant Examiner—Brian K. Green
Attorney, Agent, or Firm—Townsend and Townsend

[57] ABSTRACT

A restraining system for a child's car seat having a pair of arms raised and lowered with respect to the seat and a shield movable relative to the arms. The restraining system includes means for retaining the selected positioning of the shield and means for releasing the retaining means to permit relative movement of the shield and arms. A plurality of recesses are formed on a lower surface of the shield. The retaining means comprises a plunger having a protrusion at one end engaging one of the recesses. The releasing means includes a lever movable in a direction substantially parallel to the lower surface of the shield. The lever includes a camming surface opposing a first biasing means biasing the plunger into its retained position. Actuation of the lever releases engagement of the plunger from the recesses. A second biasing means biases the releasing means out of engagement with the retaining means.

3 Claims, 2 Drawing Sheets

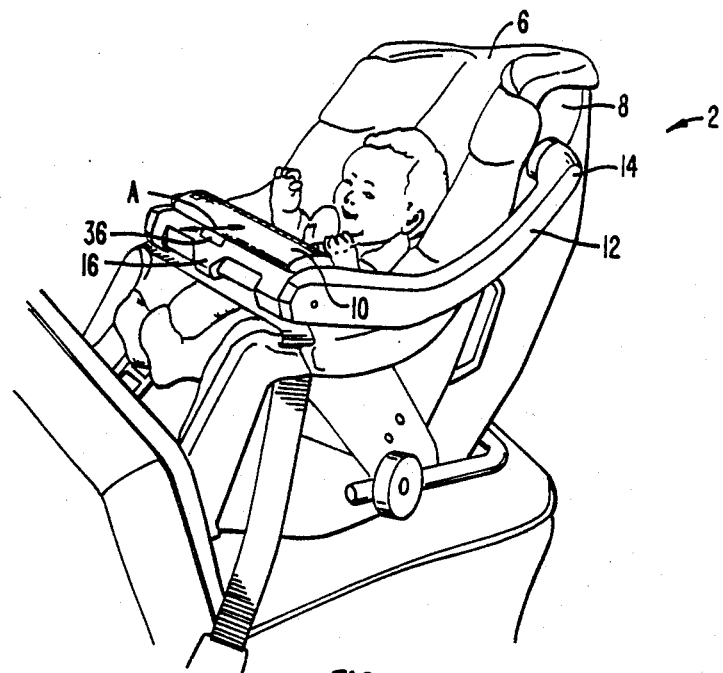
FIG._1.
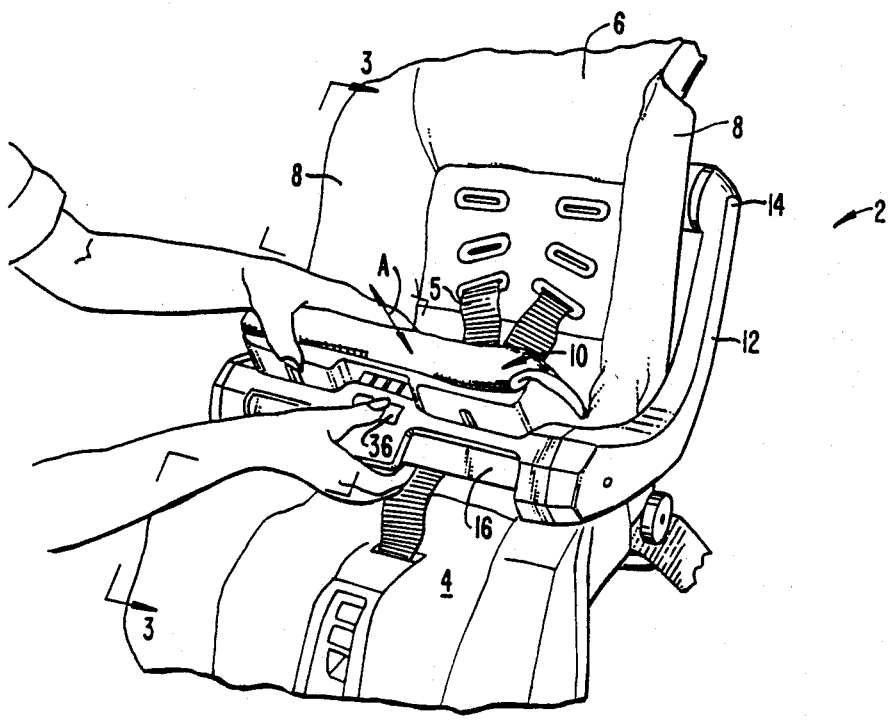
FIG._2.

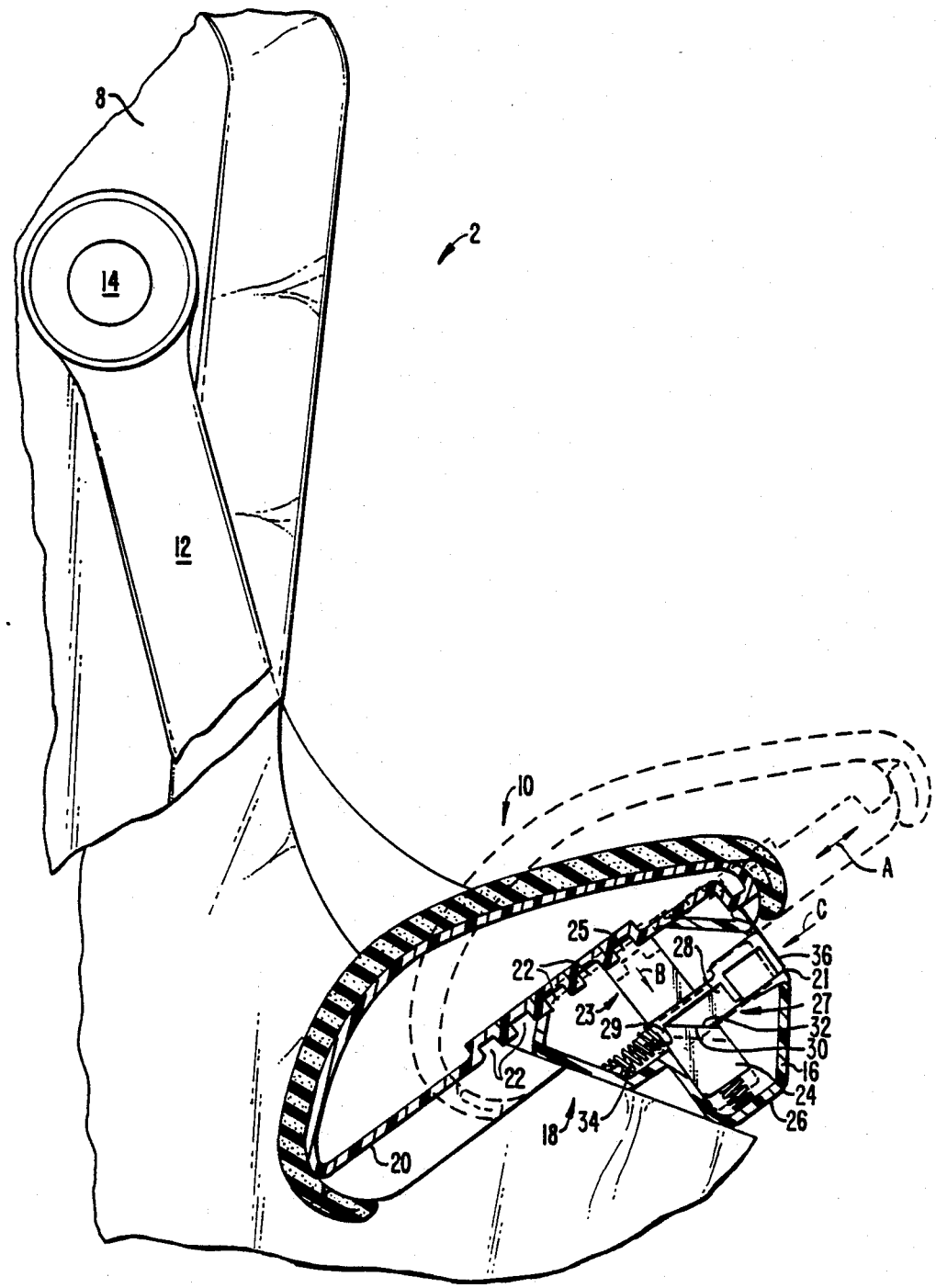
FIG._3.

CHILD'S CAR SEAT RESTRAINT SYSTEM

BACKGROUND OF THE INVENTION

1. Field of the Invention

This invention relates to an improved restraining system for a child's car seat.

Car seats are designed to carry small children, from infants to toddlers. The child's car seats must have the capacity to adapt to the child's increasing size without sacrificing security of the safety restraint system.

Some car seats include a safety shield positioned in front of the child to provide an impact cushion for the child's upper body and a support for the child's hands. Additionally, the shield provides a restraining mechanism for the child's abdomen in addition to the harness straps for restraining the child's upper body. However, in the past, these shields allow only a fixed distance between the back portion of the car seat and the shield. In adjusting the various straps for restraining the child, it is not possible to independently adjust the fixed distance for the child's abdomen.

2. Description of the Prior Art

U.S. Pat. No. 4,655,506 to Wise et al. discloses a car seat adjustable for a child of varying size. However, the adjustment for the car seat disclosed in U.S. Pat. No. 4,655,506 is dependent upon several factors. The adjustment of the straps and shield are interdependent.

SUMMARY OF THE INVENTION

The present invention is a restraining system including a safety shield which may be adjusted independently of the remaining elements of the car seat. As is conventional, the car seat includes a bottom portion for vertical support of the child, a back portion substantially perpendicular to the bottom portion for the child's back support, and two side portions, preferably adjacent to the back portion and substantially perpendicular to both the back portion and the bottom portion. A pair of arms is mounted to the side portions and movable upwardly, above the top of the chair, leaving the chair area generally clear for placing the child properly into the car seat. A safety shield is mounted to a shield support and extends between the pair of arms for additional protection.

In the present invention, the safety shield is movable relative to the pair of arms to adjust the effective space between the arms and back portion to accommodate children of various sizes.

In the preferred embodiment, the car seat restraining system includes a plunger for retaining the selected positioning of the shield. A lower surface of the shield includes a plurality of recesses formed therein for receiving the plunger. A first biasing means, preferably in the form of a spring, biases the plunger toward the lower surface and into engagement with one of the recesses.

A releasing means, preferably a lever, is movable from an at rest position to a position opposing the first biasing means. The releasing means allows for disengagement of the plunger with the recesses. When the releasing means is in its position opposing the first biasing means, the shield may be adjusted with respect to the pair of arms. The releasing means includes a camming surface cooperating with an inclined surface of the plunger. As the button is depressed, the camming surface engages the inclined surface of the plunger, urging the plunger downwardly and out of engagement with the recesses. The releasing mechanism includes a second biasing means, preferably in the form of a spring, biasing the lever and, therefore the camming the surface, out of engagement with the inclined surface of the plunger.

BRIEF DESCRIPTION OF THE DRAWINGS

FIG. 1 is a perspective view of the present invention illustrating a child restrained within the car seat.

FIG. 2 is a perspective view of the embodiment of FIG. 1 illustrating adjustment of the safety shield.

FIG. 3 is a cross-sectional view taken along lines 3—3 of FIG. 2.

DETAILED DESCRIPTION OF THE DRAWINGS

Referring now to the drawings, FIG. 1 illustrates a car seat 2 constructed in accordance with the present invention. Car seat 2 includes a shield 10 mounted on shield support 16 between a pair of arms 12. Shield 10 is slidable in the direction of arrow A, as seen in the Figures. Arms 12 are attached to side portions 8 at pivots 14. Side portions 8 extend from a back portion 6 and a bottom portion 4 for supporting and enclosing the child within car seat 2. Harness straps 5 are threaded through back portion 6, shield 10 and bottom portion 4 for restraining the child within car seat 2. Back portion 6, Bottom portion 4, side portions 8 and shield 10 are padded for cushioning the child.

Turning now to FIG. 3, shield 10 is seen in its rearwardmost position in solid lines. Shield 10 is seen in its forwardmost position in phantom lines.

Positioning mechanism 18 releasably locks shield 10 in a selected position relative to arms 12. Positioning mechanism 18 includes retaining means 23 and releasing means 27.

Shield 10 includes a lower surface 20 having a plurality of recesses 22 formed therein. A plunger 24, having a protrusion 25 at its uppermost end, is biased upwardly into a selected one of recesses 22 by first biasing means 26 for retaining shield 10 in its desired position. A lever 28 includes camming surface 30 cooperating with an inclined surface 32 for movement of plunger 24 along arrow B. A second biasing means 34, engaging end 29 of lever 28 biases the lever opposite the direction of arrow C. A button 36, positioned at an exposed end 21 of lever 28, is actuatable to release retaining means 23 for allowing movement of shield 10 along arrow A.

The operation of movement of shield 10 along shield support 16 in the direction of arrow A will now be described. The at rest position of releasing means 27 is shown in solid lines in FIG. 3. The position opposing biasing of first biasing means 26 is shown in phantom lines in FIG. 3. In the at rest position, first biasing means 26 biases plunger 24 upwardly, in the opposite direction of arrow B, such that protrusion 25 engages a selected one of recesses 22. Second biasing means 34 engages end 29 of layer 28 and biases the lever opposite the direction of arrow C. In this position, camming surface 30 rests upon inclined surface 32 of plunger 24. When it is desired to reposition shield 10, button 36 is depressed in the direction of arrow C, as shown in FIG. 3, opposing the biasing of second biasing means 34. As button 36 is depressed, camming surface 30 engages inclined surface 32, opposing the biasing of first biasing means 26 and moving plunger 24 in the direction of arrow B, thereby releasing protrusion 25 from engagement with the recess 22.

At the same time, shield 10 may be moved along support shield 16 in the direction of arrow A for repositioning of the shield on shield support 16. When shield 10 is repositioned to its desired position, button 36 is released, allowing spring 26 to bias plunger 24 and projection 25 to engage a second selected recess 22 for retaining shield 10 in its new position.

This invention has been described with reference to the preferred embodiment. Variations and modifications can be made without departing from the scope of the present invention, which is limited only by the following claims.

I claim:

1. In a child's car seat comprising:
   a bottom portion;
   a back portion disposed substantially perpendicular to said bottom portion;
   a pair of side portions disposed adjacent to said back portion;
   a pair of arms each rotatably mounted at one end to respective of said side portions; and
   a shield support fixed between said pair of arms opposite from said rotatably mounted ends;
   the improvement comprising a safety shield movably mounted to the upper surface of said shield support and a positioning mechanism provided by said shield support, said safety shield including a lower surface having a plurality of recesses formed therein, said safety shield being movable to selected positions relative to said support by engagement of said positioning mechanism in a selected one of said recesses, said positioning mechanism including:
   a plunger for retaining the selected positioning of said safety shield;
   first means for biasing said plunger into engagement with a selected one of said recesses;
   releasing means for opposing the biasing of said first means to permit the relative movement of said shield and said arms; and
   second means for biasing said releasing means out of cooperation with said plunger.

2. The car seat as defined in claim 1 wherein said releasing means comprises a lever operable to oppose the biasing of said second biasing means, actuate said camming surface, and thereby release said retaining means from the selected one of the recesses.

3. A child's car seat in accordance with claim 1, wherein said releasing means includes a camming surface cooperating with a surface of said plunger.

* * * * *